(12) United States Patent
Fujita et al.

(10) Patent No.: US 8,265,398 B2
(45) Date of Patent: Sep. 11, 2012

(54) IMAGE ANALYSIS SYSTEM AND IMAGE ANALYSIS PROGRAM

(75) Inventors: Hiroshi Fujita, Gifu (JP); Toshiaki Nakagawa, Hamamatsu (JP); Yoshinori Hayashi, Ogaki (JP)

(73) Assignee: Kowa Company, Ltd., Nagoya-shi (JP)

( * ) Notice: Subject to any disclaimer, the term of this patent is extended or adjusted under 35 U.S.C. 154(b) by 464 days.

(21) Appl. No.: 12/531,123

(22) PCT Filed: Mar. 10, 2008

(86) PCT No.: PCT/JP2008/054272
§ 371 (c)(1),
(2), (4) Date: Feb. 23, 2010

(87) PCT Pub. No.: WO2008/111550
PCT Pub. Date: Sep. 18, 2008

(65) Prior Publication Data
US 2010/0142852 A1    Jun. 10, 2010

(30) Foreign Application Priority Data

Mar. 13, 2007  (JP) .................................. 2007-062899

(51) Int. Cl.
*G06K 9/00* (2006.01)
*G01B 11/30* (2006.01)
*A61B 3/14* (2006.01)

(52) U.S. Cl. ........ 382/195; 382/154; 382/220; 356/611; 351/206

(58) Field of Classification Search .................. 382/382, 382/103, 106, 117, 118, 154, 168, 190, 195, 382/203, 218, 220, 221, 224, 274, 275, 285; 356/12, 611, 627; 351/206; 348/E13.008
See application file for complete search history.

(56) References Cited

U.S. PATENT DOCUMENTS 6,046,745 A * 4/2000 Moriya et al. ................. 345/420
(Continued)

FOREIGN PATENT DOCUMENTS

DE          69922903          1/2006
(Continued)

OTHER PUBLICATIONS

International Search Report of PCT/JP2008/054272 mailing date of Apr. 8, 2008.

*Primary Examiner* — Sheela Chawan
(74) *Attorney, Agent, or Firm* — Miller, Matthias & Hull LLP

(57) ABSTRACT

There is provided an image analysis system which captures image data of an arbitrary pair of a first image RI and a second image LI among images obtained by color-photographing a single object from different positions into an analysis computer, wherein the computer includes corresponding point extraction means for assigning a weighing factor to a pixel information value based on the contrast size of the pixel information value in each of a first local area ROI1 set around an arbitrary reference point in RI and second local areas ROI2s at which scanning is performed on LI, calculating the similarity between ROI1 and ROI2s, and extracting a corresponding point which corresponds to the reference point from a ROI2 having the highest similarity, and depth information calculating means for calculating depth information of the object based on coordinates of the reference point and the corresponding point.

7 Claims, 5 Drawing Sheets

U.S. PATENT DOCUMENTS

| | | | |
|---|---|---|---|
| 6,224,212 B1 | 5/2001 | Noda et al. | |
| 6,714,672 B1 * | 3/2004 | Berestov et al. | 382/154 |
| 6,893,128 B2 * | 5/2005 | Mizukusa et al. | 351/206 |
| 6,985,075 B2 * | 1/2006 | Takeda | 340/435 |
| 7,031,554 B2 * | 4/2006 | Iwane | 382/305 |
| 7,206,080 B2 * | 4/2007 | Kochi et al. | 356/611 |
| 7,284,859 B2 * | 10/2007 | Ferguson | 351/205 |
| 7,310,446 B2 * | 12/2007 | Kato et al. | 382/218 |

FOREIGN PATENT DOCUMENTS

| | | |
|---|---|---|
| EP | 997101 | 5/2000 |
| JP | 6-167324 | 6/1994 |
| JP | 11-248433 | 9/1999 |
| JP | 2954320 | 9/1999 |
| JP | 2000-126134 | 5/2000 |
| JP | 2000-245700 | 9/2000 |
| JP | 2004-7213 | 1/2004 |
| JP | 2004-7213 A | 1/2004 |
| JP | 2006-254104 | 9/2006 |
| WO | WO 2007/110982 | 10/2007 |

\* cited by examiner

IMAGE ANALYSIS SYSTEM AND IMAGE ANALYSIS PROGRAM

CROSS-REFERENCE TO RELATED APPLICATIONS

This application is a U.S. national stage filing of International Patent Application No. PCT/JP2008/054272 filed on Mar. 10, 2008, which claims priority under the Paris Convention to Japanese Patent Application No. 2007-062899, filed on Mar. 13, 2007.

FIELD OF THE DISCLOSURE

1. Technical Field

The present invention relates to an image analysis system and an image analysis program, more particularly an image analysis system for calculating depth information in order to restore a three-dimensional shape of a photographing object from a stereo image, and an image analysis program used for the image analysis system.

2. Background of the Disclosure

A process to restore a three-dimensional shape of a photographing object by image analysis is typically performed as follows. A corresponding point, which corresponds to a point in one of a pair of images obtained by photographing a single photographing object from different positions and is a point in the other of images, is extracted. Then, three-dimensional coordinates are obtained with the principle of triangulation based on a disparity between coordinates of the points and a distance between two photographing positions.

It is expected that such image analysis be utilized in the medical field, for example, for diagnosis using a fundus image. Here, conditions of the fundus give useful information for diagnosis of glaucoma, diabetes, hypertension, and the like. Particularly, C/D ratio of a cup to a disc gives an important indicator of diagnosis of glaucoma. The C/D ratio is usually obtained by observing a fundus photograph by an expert such as a physician, distinguishing the disc and cup, and assigning a scale to the photograph to read the scale.

However, the number of glaucoma patients is large among opthalmologic diseases and is expected to be larger as society is aging. Therefore, there is a concern that the increasing burdens are imposed on physicians who observe fundus photographs to diagnose. Further, the same diagnosis results are not necessarily obtained from one fundus photograph if observers are different because macroscopic observation of the photograph inevitably leads to different results among individuals. In addition, even if one physician observes one fungus photograph, the same diagnosis results are not necessarily obtained at different times.

For this reason, computer-aided diagnosis (hereinafter, referred to as "CAD") system has been developed. With this system, a diagnosis by a physician is supported by automatically analyzing digitalized fundus image data by a computer to provide the physician with the analyzed result as objective information. For example, as a conventional CAD system, an apparatus which restores a three-dimensional shape of a fundus by image analysis in order to quantitatively evaluate the disc and the cup, and the like, is proposed (for example, Patent Documents 1 and 2)

Patent Document 1: Japanese Patent Publication No. 2954320

Patent Document 2: Japanese Patent Application Laid-open No. 2000-245700

DISCLOSURE OF THE INVENTION

Problems to be Solved by the Invention

However, in a conventional method and apparatus (Patent Document 1), a plurality of stereo images are photographed while photographing conditions of images are previously changed, the most probable portion is selected from each of the resulting three-dimensional shapes. Therefore, stereo images are required to be photographed under a plurality of photographing conditions in which brightness of the light source, wavelength, or the like is changed. This requires troublesome tasks and considerable time. Further, it is considered that it is important to extract a corresponding point at high accuracy in order to restore a three-dimensional shape of a photographing object with the principle of triangulation. In the conventional method and apparatus, however, a step of extracting the corresponding point has not been performed at high accuracy.

On the other hand, in a conventional apparatus and a program recording medium (Patent Document 2), each depth information for each color component is obtained from an image, these pieces of depth information are synthesized to restore a three-dimensional shape. When pieces of depth information for each color component are synthesized, the image is weighed by area. It is intended that contour information of a boundary between a disc and peripherals thereof is utilized to increase extraction accuracy of the corresponding point. However, the image is weighed by roughly classifying areas into an area in the disc and an area outside the disc. Therefore, the three-dimensional shape in every detail has not been sufficiently obtained at high accuracy. Further, a three-dimensional shape of a cup, which is important to calculate C/D ratio, cannot be obtained at high accuracy because it is not considered that extraction accuracy of the corresponding point in the area of disc is increased. And, there has been a problem at this point.

SUMMARY OF THE DISCLOSURE

In view of these problems, an object of the present invention is to provide an image analysis system which extracts a corresponding point from a stereo image at high accuracy and calculates depth information more precisely in order to restore a three-dimensional shape of a photographing object, and an image analysis program used for the image analysis system.

Problems to be Solved by the Invention

In order to achieve the above-described object, according to the present invention, there is provided "an image analysis system which captures image data of an arbitrary pair of a first image and a second image among two or more images obtained by color-photographing a single photographing object from different photographing positions into an image analysis computer for analysis, wherein the image analysis computer includes corresponding point extraction means for assigning a weighing factor to a pixel information value based on the contrast size of the pixel information value describing characteristics of a pixel in each of a first local area set around an arbitrary reference point in the first image and second local areas which are set to the same size as the first local area inside the second image and at which scanning is performed on the second image, calculating the similarity between the first local area and the second local areas, and extracting a corresponding point which corresponds to the reference point from a second local area having the highest similarity, and depth information calculating means for calculating depth information of the photographing object based on coordinates of the reference point and the corresponding point."

"The image analysis computer" includes a central processing unit (CPU) and a main memory apparatus and a commercially available general computer can be used for the image analysis computer. An image analysis program which will be described later is stored in the main memory apparatus. The image analysis program functions the image analysis computer as the corresponding point extraction means and the depth information calculating means. The CPU reads out the stored program to perform the following image analysis.

The image analysis system according to the present invention may include an image data acquisition apparatus for acquiring image data, a display device such as a monitor and a printer which displays processes and results of processings by the image analysis computer, an input device such as a keyboard and a pointing device by which various commands and data are input to the image analysis computer, and the like, in addition to the image analysis computer. Here, examples of the image data acquisition apparatus includes a digital imaging apparatus, such as a digital still camera, by which a photographing object is photographed to acquire digitalized image data and a digitalizing apparatus, such as a laser scanner, by which an analog image is read to convert the image to electric data. The image data acquired by the image data acquisition apparatus can be captured into the image analysis computer through a recording medium such as a CD-R and a flexible device, or a hardware interface.

Data representing an image can be used as the "image data" obtained by color-photographing as a set of pixels to which memory with, for example, 8 bits of red (R), 8 bits of green (G), 8 bits of blue (B) is assigned, and which is represented in two-dimensional coordinates.

A "first image" and a "second image" are an arbitrary pair of images among two or more images, which are photographed from different photographing positions and distinguished for a convenience. For example, when images are two, one of them is the first image and the other is the second image, of course, but whichever of images may be the first image. Further, when images are three or more, a plurality of combinations of the first image and the second image are present. In this case, extraction process of the corresponding point, which will be described below, may be performed either for a plurality of combinations or for any one of combinations.

If a pixel to which a "reference point" which is an arbitrary pixel in the first image corresponds in the second image is identified, that is to say, a "corresponding point" can be extracted from the second image, three-dimensional coordinates at one point on a photographing object identified by the reference point and the corresponding point can be calculated with the principle of triangulation based on a disparity between coordinates of the reference point and the corresponding point and a distance between photographing positions of the first image and the second image. Here, the three-dimensional coordinates at one point on the photographing object is referred to as "depth information" in terms of that point. Therefore, the "depth information calculating means" of the invention is means for calculating three-dimensional coordinates with the principle of triangulation based on coordinates of the reference point and the corresponding point and a distance between known photographing positions.

Comparison of similarity between a pair of images for each pixel makes difficult and unstable to judge for extraction of the corresponding point. For, this reason, similarity is areally compared between a "first local area" constituted by a reference point in the first image and a plurality of pixels around the reference point and each of "second local areas" set to the same size as the first local area in the second image. Then, scanning is performed at second local areas on the second image for one reference point set in the first image and a second local area having the highest similarity to the first local area can be determined so that the corresponding point can be extracted from the second local area. Further, a process in which a reference point is set to another pixel in the first image and the corresponding point with respect to the reference point is extracted is repeated. With this process, a corresponding point can be extracted from the second image for each of all pixels of the first image.

For example, cross-correlation method, squares residual method (least squares method) and sequential similarity detection method can be used as a method of calculating "similarity" between a first local area and a second local area.

A "pixel information value" indicates characteristics of individual pixel in number. The characteristics include, for example, a brightness value of each color component such as an R component, a G component, and a B component, and characteristic amounts (hue, saturation, and luminosity) calculated based on the each brightness value. Further, "contrast of the pixel information value" is defined as a difference between a maximum value and a minimum value in each local area, a value obtained by dividing a difference between a maximum value and a minimum value by a sum of a maximum value and a minimum value, or a dispersion of the pixel information values, for pixel information values of the same kind.

With the above configuration, information having larger contrast of the pixel information value, that is, the pixel information value having more information amount can be largely contributed to calculation of similarity between the first local area and the second local areas, eventually extraction of the corresponding point. This makes possible to calculate depth information about the photographing object more precisely since the corresponding point is extracted at high accuracy. For example, even if there is a portion at which shading of some color component in the photographed image is poor, the following concern can be reduced. The concern is that information of the portion affects to erroneously determine that a point, which actually does not correspond to, corresponds to, and the point is extracted.

Further, contrast size of the pixel information value is determined for "each local area" set around each pixel, the pixel information value is weighed for "each local area" based on the contrast size. Accordingly, difference of information amounts in the image details is sensitively reflected so that the corresponding point can be extracted at high accuracy.

An image analysis system according to the present invention can be a system in which "the corresponding point extraction means calculates the similarity by assigning zero as a weighing factor to the pixel information value, or calculates the similarity by excluding the pixel information value when the contrast size of the pixel information value is equal to or less than a predetermined value." Here, the "predetermined value" can be defined for each kind of pixel information value.

With the above configuration, when the similarity between the first local area and the second local areas is determined, a pixel information value having small information amount in the relevant local area is used for calculation of similarity by assigning zero as a weighing factor to the value, or is previously excluded from calculation of the similarity. Therefore, extraction of the corresponding point is not affected by the pixel information value having less information amount so that the corresponding point can be extracted at high accuracy. Further, depth information about the photographing object can be extracted more precisely.

Meanwhile, when the contrast size of the pixel information value of any kinds is equal to or less than a predetermined value in a local area, similarity may not be calculated for that local area. For example, when similarity is not calculated for the first local area around the reference point, a corresponding point with respect to the reference point is not obtained. This results in missing parts of depth information. However, more reliable depth information obtained based on another reference point around the first local area and a corresponding point with respect to the reference point is used for compensation so that depth information can be obtained more precisely as a result in comparison with a case where a pixel information value having small information amount is used and an imprecise corresponding point is extracted.

Next, the image analysis system according to the present invention can be a system in which "the image analysis computer includes three-dimensional shape restoring means for restoring a three-dimensional shape of the photographing object based on a plurality of the depth information" in addition to the above configuration.

With the above configuration, according to the present invention, depth information for a plurality of points on the photographing object identified by reference points and corresponding points thereof by setting a plurality of the reference points in one of a pair of images and extracting the corresponding points from the other image for each of the reference points. As a result of that, a three-dimensional shape of the photographing object can be restored. In the invention, a three-dimensional shape of the photographing object can be restored at high accuracy since the corresponding points can be extracted at high accuracy as described above.

Further, the image analysis system according to the present invention can be a system in which "the image analysis computer further includes edge extraction means for extracting edge based on the image data, and the pixel information value includes a plurality of values among an R component value, a G component value, and a B component value as well as an R edge component value, a G edge component value and a B edge component value extracted by the edge extraction means."

"R component value, G component value, and B component value" can be brightness values of each color component of the R component, the G component and the B component. "R edge component value, G edge component value and B edge component value" can be obtained by subjecting the R component value, the G component value, and the B component value to "edge extraction" process in which changes of the brightness values of each color component are extracted. For example, the edge extraction can be performed by differentiating (primary differentiating, secondary differentiating) the brightness values between adjacent pixels.

With the above configuration, according to the present invention, the edge component values are included in the pixel information value. Therefore, characteristics of the pixel including a relationship with pieces of information which adjacent pixels have in addition to information such as a brightness value which each pixel has individually can be described. This makes possible to calculate the similarity by using pixel information values having different properties, as kinds of the pixel information value increase. When there is a linear element (contour) in the image, a corresponding point can be extracted at higher accuracy by effectively using the information of the linear element. If luminances are largely different in a pair of images by being affected by the photographing condition or the like, there is a concern that it is difficult that similarity between images is precisely determined by only brightness values. Such a concern can be reduced by using the edge component value so that the corresponding point can be extracted at higher accuracy.

Further, the image analysis system according to the present invention can be a system in which "the photographing object is a fundus, the image analysis computer further includes disc area extraction means for extracting a first disc area and a second disc area each having a disc from the first image and the second image respectively based on the image data captured into the computer, and the corresponding point extraction means sets the reference point in the first disc area and extracts the corresponding point from the second disc area."

"Disc" has a brightness value larger than portions outside the disc and disc-occupying percentage is constant to some extent in the fundus image so that the disc area can be extracted with relative ease. For example, the disc area having a disc can be extracted as a set of pixels indicating brightness values equal to or larger than a threshold value by creating a histogram indicating a relationship between the brightness value and the number of pixels having the brightness value and setting the threshold value such that the fundus image is cut in a percentage somewhat larger than the disc-occupying percentage.

With the above configuration, the present invention is applied to image analysis of the fundus image and can be functioned as a CAD system highly supporting diagnosis of glaucoma. Time and effort for searching the corresponding point in an area which is not useful for diagnosis of glaucoma are eliminated and depth information can be effectively calculated for a disc providing information useful for diagnosis of glaucoma and a cup in that area in a short time by including disc area extraction means, previously extracting a disc area having a disc and extracting the corresponding point only in the area.

Next, the image analysis program according to the present invention "functions the image analysis computer as image data capturing means for capturing image data of an arbitrary pair of the first image and the second image among two or more images obtained by color-photographing a single photographing object from different photographing positions, corresponding point extraction means for assigning a weighing factor to a pixel information value based on the contrast size of the pixel information value describing characteristics of a pixel in each of a first local area set around an arbitrary reference point in the first image and second local areas which are set to the same size as the first local area inside the second image and at which scanning is performed on the second image, calculating similarity between the first local area and the second local areas, and extracting a corresponding point which corresponds to the reference point from a second local area having the highest similarity, and depth information calculation means for calculating depth information of the photographing object based on coordinates of the reference point and the corresponding point."

The image analysis program according to the present invention can be a program "which functions the image analysis computer as three-dimensional shape restoring means for restoring a three-dimensional shape of the photographing object based on a plurality of the depth information" in addition to the above configuration.

With the above configuration, the image analysis computer which is a main component of the above image analysis system is functioned by running the image analysis program of the invention and the above excellent operation effect can be obtained.

As described above, there is provided an image analysis system which extracts a corresponding point from a stereo image at high accuracy, and calculates depth information for restoring a three-dimensional shape of a photographing object more precisely and image analysis program used for the image analysis system.

DETAILED DESCRIPTION OF THE DISCLOSURE

Hereinafter, an image analysis system and an image analysis program according to a preferred embodiment will be described below with reference to FIGS. 1 to 10. Here, in the present embodiment, a case where the present invention is applied to the image analysis system of a fundus image and the image analysis program of the fundus image is illustrated.

Figure 1:
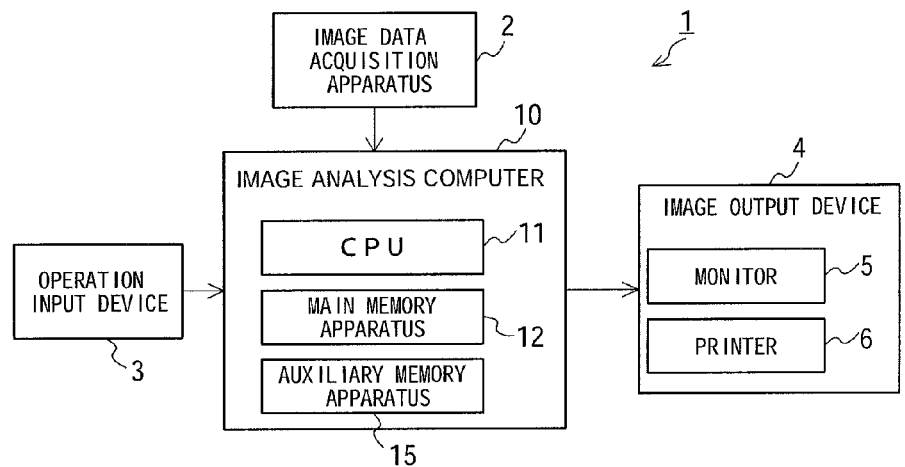
FIG. 1 is a block diagram showing a structure of an image analysis system according to the present embodiment.

As shown in FIG. 1, an image analysis system 1 of the embodiment includes an image data acquisition apparatus 2 which acquires image data, an image analysis computer 10 which captures image data acquired by the image data acquisition apparatus 2 to perform image analysis, an operation input device 3 such as a keyboard, a mouse and a pointing device, which inputs various commands and data into the image analysis computer 10 and an image output device 4 constituted by a monitor 5 which displays processes and results of processings by the image analysis computer 10 on a screen and a printer 6 which prints the processes and results of processings to a film or a paper medium.

As will be described in more detail, in the embodiment, a digital fundus camera which color-photographs a fundus and acquires digitalized image data is used as the image data acquisition apparatus 2. Then, the fundus is photographed with the digital fundus camera from two photographing positions separated at right and left sides to obtain a right and left pair of fundus images. Hereinafter, although it is described that a first image is set as a right image and a second image is as a left image for a convenience also in the drawing, it is not limited thereto and may be adverse.

The image analysis computer 10 includes a main memory apparatus 12, a central processing unit (CPU) 11 which performs operation and processing according to the image analysis program stored in the main memory apparatus 12 and an auxiliary memory apparatus 15 such as a hard disk, as hard components. Here, captured image data and various data processed by the image analysis program can be stored in the auxiliary memory apparatus 15.

Figure 2:
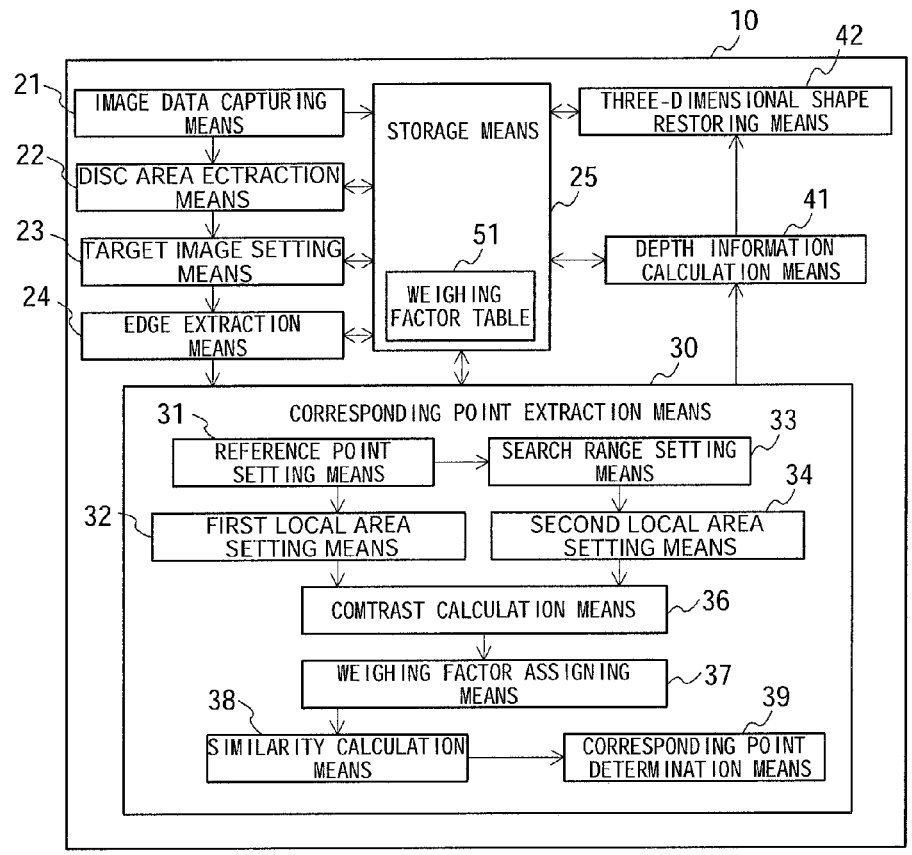
FIG. 2 is a block diagram showing a functional structure of an image analysis computer in the image analysis system of FIG. 1.

As illustrated in FIG. 2, the image analysis computer 10 includes, as functional components, image data capturing means 21 for capturing image data acquired by the image data acquisition apparatus 2, disc area extraction means 22 for extracting a first disc area and a second disc area each having a disc from the first image and the second image respectively based on the captured image data, target image setting means 23 for setting the first disc area and the second disc area to a first target image and a second target image to be analyzed for extraction of a corresponding point, edge extraction means 24 for extracting edge based on the image data, corresponding point extraction means 30 for extracting the corresponding point which corresponds to an arbitrary reference point in the first target image from the second target image, depth information calculation means 41 for calculating depth information based on coordinates of the reference point and the corresponding point and three-dimensional shape restoring means 42 for restoring a three-dimensional shape of the fundus based on a plurality of depth information.

Here, the corresponding point extraction means 30 includes reference point setting means 31 for setting a reference point to an arbitrary pixel in the first target image, first local area setting means 32 for setting a first local area around the reference point, search range setting means 33 for setting a search range where a corresponding point is searched around the pixel having the same coordinates as the reference point in a second target image, second local area setting means 34 for setting second local areas size of which are the same as the first local area, in the search range, contrast calculation means 36 for calculating a contrast size of a pixel information value describing characteristics of a pixel for each of the first local area and the second local areas, weighing factor assigning means 37 for assigning a weighing factor to the pixel information value based on the calculated contrast size, similarity calculation means 38 for calculating similarity between the first local area and the second local areas using the pixel information value to which the weighing factor is assigned and corresponding point determination means 39 for determining the corresponding point in a second local area with the highest calculated similarity.

Further, the image analysis computer 10 includes storage means 25 for storing captured image data and various data obtained as processes and results of processings. A weighing factor table 51 by which weighing factors to be assigned to the pixel information values are defined for each kind of the pixel information value according to a relationship between a predefined reference value and a contrast size is stored in the storage means 25.

Figure 3:
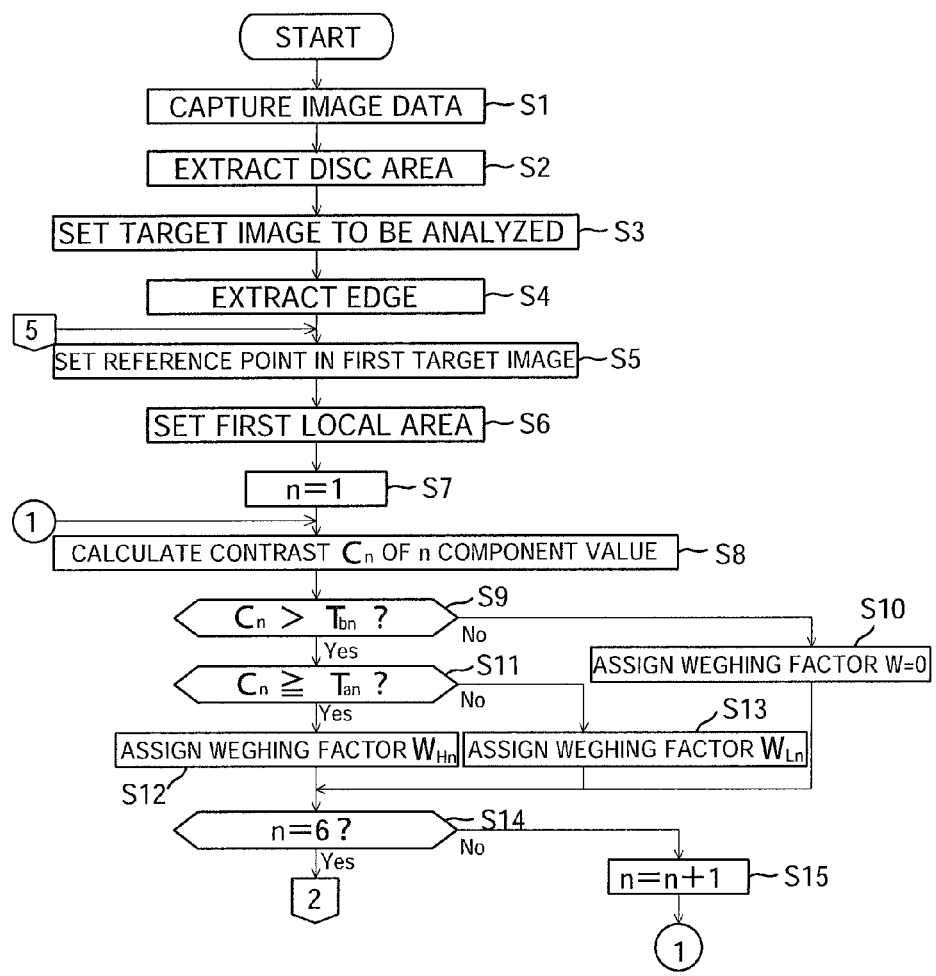
FIG. 3 is a flowchart showing a flow of image analysis by an image analysis program according to the present embodiment.
Figure 4:
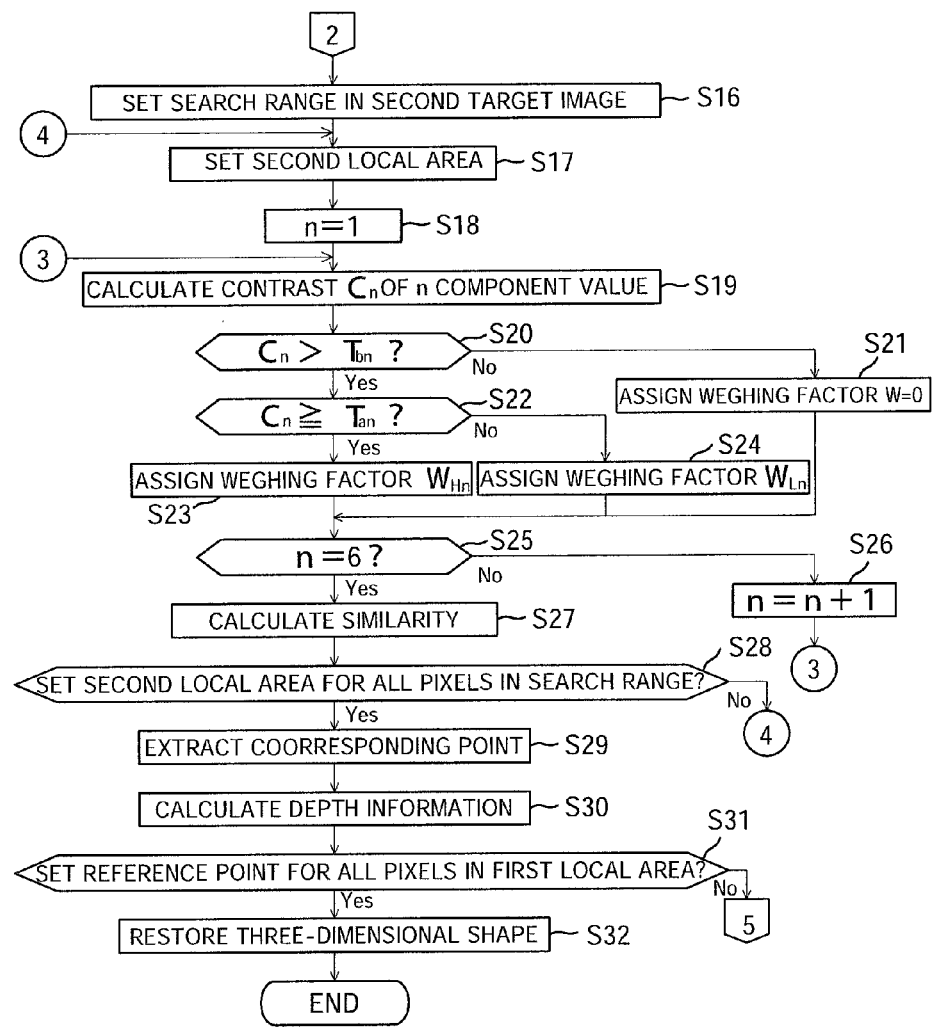
FIG. 4 is a flowchart showing a flow of image analysis by the image analysis program according to the present embodiment.

Next, flows of the image analysis by the image analysis program according to the embodiment are described mainly based on FIGS. 3 and 4 with reference to FIGS. 5 to 10. Meanwhile, in flowcharts of FIGS. 3 and 4, step S5 to step S29 are performed by the corresponding point extraction means 30 according to the embodiment.

First, image data of the first image and the second image acquired by the image data acquisition apparatus are captured into the image analysis computer (step S1). For example, image data can be captured into the image analysis computer indirectly via a recording medium such as a CD-R and a flexible disk in which image data acquired by the image data acquisition apparatus are stored, or directly via a hardware interface from the image data acquisition apparatus. A first image RI and a second image LI can be output to an image output device such as a monitor based on the image data captured (see, FIG. 5).

Figure 5:
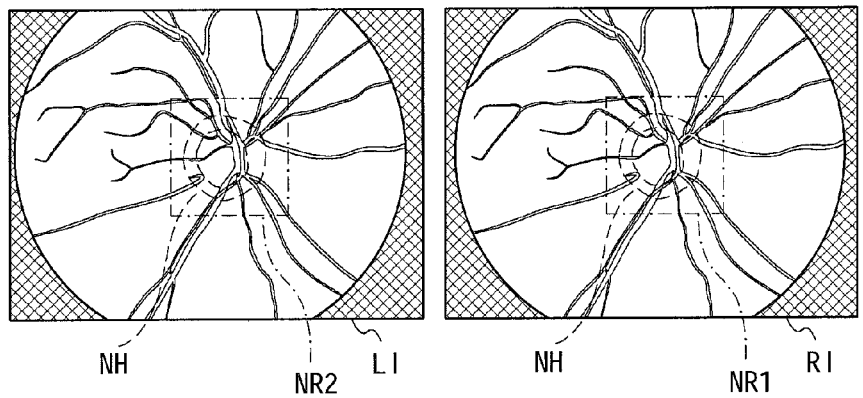
FIG. 5 is a view illustrating image analysis by the image analysis program according to the present embodiment.
Figure 6:
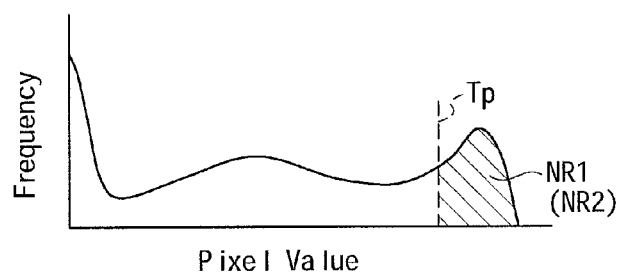
FIG. 6 is a view illustrating image analysis by the image analysis program according to the present embodiment.

Next, a first disc area NR1 and a second disc area NR2 which are the same size are extracted from the first image RI and the second image LI respectively so that each of the first disc area NR1 and the second disc area NR2 includes a disc NH (step S2) (see, FIG. 5). Here, disc areas NR1 and NR2 can be extracted as follows, for example. Generally, disc has a brightness value larger than portions outside the disc and disc-occupying percentage is defined to be constant to some extent in the fundus image. Then, as shown in FIG. 6, for each of the first image and the second image, a histogram indicating a relationship between the brightness value of the pixel and the number of pixels having the brightness value is created and a threshold value Tp is set so that the image is cut out in a percentage larger than a disc-occupying percentage in the fundus image. Therefore, disc areas NR1 and NR2 can be extracted as a set of pixels having a brightness value of the threshold value Tp or more.

Figure 7:
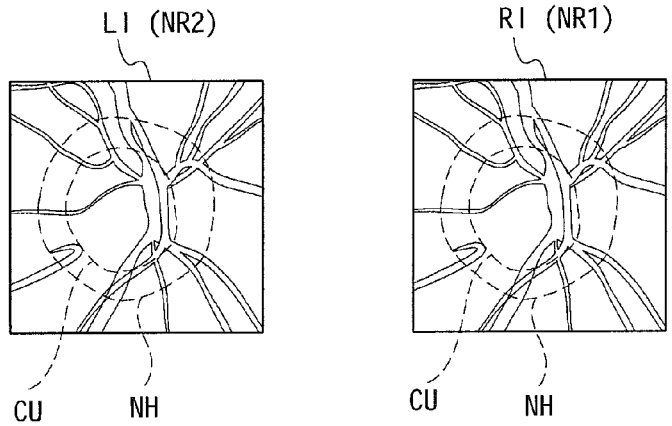
FIG. 7 is a view illustrating image analysis by the image analysis program according to the present embodiment.
Figure 8:
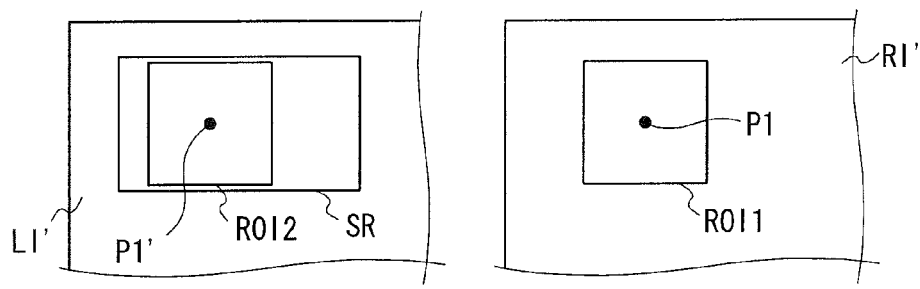
FIG. 8 is a view illustrating image analysis by the image analysis program according to the present embodiment.
Figure 9:
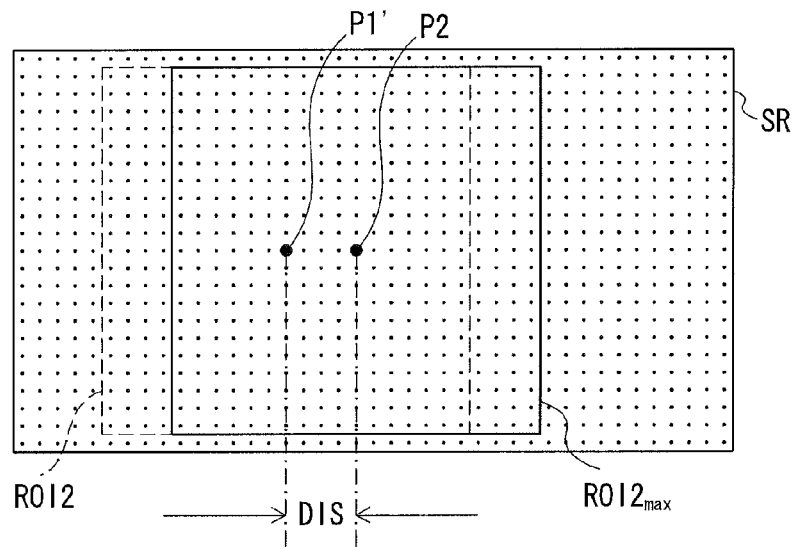
FIG. 9 is a view illustrating image analysis by the image analysis program according to the present embodiment.
Figure 10:
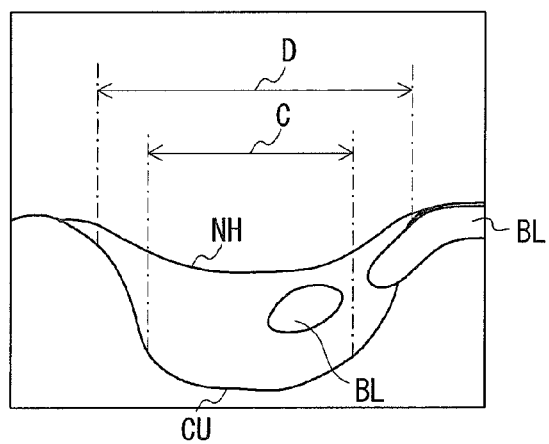
FIG. 10 is a view illustrating image analysis by the image analysis program according to the present embodiment.

Next, an origin of coordinates is set at a position where the extracted first disc area and second disc area are corresponded with each other and coordinates of the image data of the first disc area and the second disc area are transformed to set the transformed coordinates to a first target image RI' and a second target image LI' (step S3) (see, FIG. 7). The first target image RI' and the second target image LI' include a disc NH and a cup CU providing useful information for diagnosis of glaucoma. In the subsequent processes, only the first target image RI' and the second target image LI' are set to be targets so that image analysis is performed efficiently. Meanwhile, the first target image RI' and the second target image LI' can be output to the image output device such as a monitor.

Prior to the extraction process of the reference point, edges of each color component of the R component, the G component and the B component are extracted in the first target image and the second target image (step S4). Therefore, the R edge component value, the G edge component value and the B edge component value can be used as pixel information values describing characteristics of the pixel. In the embodiment, six pixel information values in total of these three edge component values and brightness values of the R component, the G component and the B component are used.

Next, extraction process of the corresponding point will be described. At first, a reference point P1 is set in an arbitrary pixel in the first target image RI' (step S5), a first local area ROI1 is set around the reference point P1 (step S6) (see FIG. 8). For example, a first local area can be set to a size of 21 pixels×21 pixels.

Thereafter, the contrast size of each pixel information value is determined in the set first local area, and a weighing factor is assigned based on the contrast size. In the embodiment, "contrast of the pixel information value" is defined as a difference between a maximum value and a minimum value of each pixel information value in the local area. However, the definition is not limited thereto, and "contrast of the pixel information value" is defined as a value obtained by dividing the difference between the maximum value and the minimum value by a sum of the maximum value and the minimum value, or a dispersion of the pixel information values.

Hereinafter, six pixel information values in total of the R component brightness value, the G component brightness value and the B component brightness value, the R edge component value, the G edge component value and the B edge component value are referred to as "nth component value" for a convenience and different n values of n=1, 2, 3, 4, 5, 6 are assigned for classification. First, n is set to be 1 and a process of extracting a corresponding point is started (step S7), and then processes are sequentially performed to the sixth component value.

For example, reference values when the nth component value is weighed based on the size of contrast $C_n$, are set to be $T_{an}$ and $T_{bn}$. A case where when $C_n \geq T_{an}$ is satisfied, $W_{Hn}$ is assigned as a weighing factor, when $T_{bn} < C_n < T_{an}$ is satisfied, $W_{Ln}$ is assigned as a weighing factor, and when $C_n \leq T_{bn}$ is satisfied, zero is assigned as a weighing factor, is described. The contrast $C_n$ of the nth component value is calculated (step S8), the contrast $C_n$, is compared with $T_{bn}$ with reference to a weighing factor table stored in the storage means (step S9). As a result, when $C_n \leq T_{bn}$ is satisfied (No at step S9), zero (W=0) as a weighing factor is assigned to the nth component value (step S10).

On the other hand, when $C_n > T_{an}$ is satisfied (Yes at step S9), $C_n$, is compared with $T_{an}$ (step S11). When $C_n \geq T_{an}$ is satisfied (Yes at step S11), $W_{Hn}$ is assigned as a weighing factor (step S12). When $C_n < T_{an}$ is satisfied (No at step S11), $W_{Ln}$ is assigned as a weighing factor (step S13). In the embodiment, $W_{Hn} > W_{Ln}$ is set to be satisfied and as the contrast $C_n$ is larger, the nth component value becomes larger. It is to be noted that the size and the number of the reference values can be defined depending on kinds of the pixel information value.

Thereafter, it is determined whether n value reaches to 6 (step S14). When the n value does not reach to 6 (No at step S14), 1 is added to n (step S15), and the process returns back to step S8. Then a process in which a weighing factor is assigned to another kind of the pixel information value depending on the contrast size is repeated (step S9 to step S14). Finally, weighing factors are assigned to all of the six pixel information values in the first local area.

Next, a second local area ROI2 is set in the second target image LI' while a processing point P1' having the same coordinates as the reference point is set to be a standard. The second local area ROI2 is shifted to search the second local area ROI2 similar to the first local area ROI1. However, in the embodiment, a range for scanning by shifting the second local area ROI2 is limited by setting a search range SR (step S16) (see, FIG. 8). This is because a possible coordinate disparity generated between the reference point and corresponding point can be limited to some range if a distance between the photographing position and the fundus to be photographed is known. The search range SR is appropriately set in this manner, processing time and cost by which the corresponding point is searched in an area where there is obviously no corresponding point are reduced so that the corresponding point is extracted efficiently. For example, the search range SR is set to be a size of 41 pixels×23 pixels larger than the first local area ROI1 and the second local area ROI2 and the center of the range can be set to be right with respect to the processing point P1'.

Then, a second local area which is the same size as the first local area is set in the search range SR (step S17), all of six pixel information values are weighed in the second local area (step S18 to step S26). It is to be noted that processes in step S18 to step S26 are the same processes of step S7 to step S15 and detail description is not repeated.

With the above processes, since all of six pixel information values are completed to be weighed in each of the first local area and the second local area, similarity between the first local area and the second local area is calculated using the pixel information values to which weighing factors are assigned (step S27). In the embodiment, the similarity is calculated using cross-correlation method. However, the present invention is not limited thereto, and sequential similarity detection method and squares residual method can be also used.

Thereafter, one second local area is set for each pixel in the search range SR and it is determined whether similarity to the first local area is calculated (step S28). When there are untreated pixels (No at step S28), the process returns back to step S17 and the second local area is shifted by second local area setting means. Then six pixel information values are weighed in the second local area (step S18 to step S26) and the similarity between the first local area and the second local area are calculated (step S27).

If the second local area is set for all pixels in the search range SR and calculation of the similarity between the first local area and the second local area is completed (Yes at step S28), a second local area $ROI2_{max}$ having the highest similarity to the first local area is extracted, a corresponding point P2 is determined as a pixel which becomes a center of the second local area $ROI2_{max}$ (step S29). As a result, a coordinate disparity DIS between the reference point P1 (or a processing point P1') and the corresponding point P2 is obtained (see, FIG. 9). Further, three-dimensional coordinates, that is, depth information is calculated for a point on the fundus identified by the reference point P1 and the corresponding point P2 with the principle of triangulation based on a coordinate disparity DIS and a distance between two photographing positions (step S30).

In addition, it is determined whether the corresponding point is extracted and depth information is calculated while all pixels in the first target image are set as reference points (step S31). When there are untreated pixels (No at step S31), the process returns back to step S5, and the reference point is shifted in the first target image by the reference point setting means and processes to step S30 are repeated.

If extraction of the corresponding point from the second target image and calculation of the depth information are completed for all pixels of the first target image (Yes at step S31), it is considered that pieces of depth information are calculated for points on the fundus identified by all combinations of the reference points and the corresponding points thereof. As a result, pieces of depth information are integrated to restore the three-dimensional shape of the fundus (step S32). Then the image analysis is ended.

Meanwhile, the restored three-dimensional shape can be output to an image output device such as a monitor and a printer. In the embodiment, the image analysis program may further include means for obtaining a diameter D of a disc NH and a diameter C of a cup CU (see FIG. 10) based on the restored three-dimensional shape and automatically calculating a C/D ratio. In addition, the image analysis program may further include means for generating an image in which blood vessel areas BL at which three-dimensional shapes of the blood vessels are restored are eliminated.

As described above, according to the image analysis system 1 and the image analysis program of the embodiment, a kind of the pixel information value having large information amount can be largely contributed to the similarity between the first local area and the second local area, eventually extraction of the corresponding point. As a result, the corresponding point is accurately extracted and the three-dimensional shape of the fundus can be restored at high accuracy so that the image analysis system 1 and the image analysis program can highly support diagnosis of glaucoma by a physician.

For example, the contrast of the R component value is prone to be small in the disc area and contrast of the B component value is prone to be small in the areas outside the disc. Further, contrast of the B component value and the G component value are prone to be high in portions across which the blood vessels travel, regardless of disc area and areas outside the disc. Therefore, difference of information amounts in image details is sensitively reflected by determining the contrast size of the pixel information value every area locally set around each pixel, and weighing the pixel information value every area locally set in accordance with the contrast size so that the corresponding point is extracted at high accuracy.

In addition, zero as a weighing factor is assigned to a kind of the pixel information value having small information amount in some local area so that the value is not contributed to the similarity calculated for extraction of the corresponding point. Therefore, a possibility that a not-similar point is erroneously extracted as a corresponding point can be reduced so that a three-dimensional shape of the fundus can be restored at high accuracy.

Further, the corresponding point can be extracted at higher accuracy by including edge component values in the pixel information value and effectively using linear elements such as a blood vessel present in the image. Even if the luminosities of the first image and the second image are largely different depending on the photographing condition or the like, the corresponding point can be extracted at high accuracy by using the kinds of pixel information value other than the brightness value.

The present invention has been described with reference to a preferred embodiment as described above. However, the invention is not limited to the above embodiment and various modifications and changes in design can be made without departing from the scope of the invention.

For example, in the above embodiment, when the contrast size of the pixel information value is equal to or less than a predetermined value, zero as a weighing factor is assigned to the pixel information value to calculate the similarity. However, the invention is not limited thereto and the similarity may be calculated excluding the pixel information value.

In addition, a right and left pair of images which are photographed from different photographing positions are set to the first image and the second image for image analysis. However, the invention is not limited thereto, and three or more images are photographed and an arbitrary pair of images among the images may be set to the first image and the second image for image analysis. In that case, although there are a plurality of combinations of the first image and the second image, the corresponding point is extracted for each of the plurality of combinations. This makes possible to obtain depth information of the photographing object, eventually a three-dimensional shape more precisely.

Further, in the above embodiment, the three-dimensional shape of the photographing object obtained as a result of image analysis is output to the output device such as a monitor and a printer, and in addition thereto, the first image and the second image and the first target image and the second target image are output to the output device in the middle way of the processes of image analysis. However, the present invention is not limited thereto. For example, there can be provided an image analysis system and an image analysis program which outputs a histogram used for extraction of a disc area as shown in FIG. 6, extraction result of the disc area, an R component value image, a G component value image, a B component value image, an R edge component value image, a G edge component value image, a B edge component value image, a optical flow showing the reference point and the corresponding point, an image showing a distribution of weighing factors for each pixel information value, an extraction image of the disc, extraction image of the cup, and the like to the output device.

Further, the digital fundus camera is used for the image data acquisition apparatus. However, the invention is not limited thereto, and a digitalizing apparatus such as a laser scanner which converts an analog image to a digitalized image data can be used for the image data acquisition apparatus.

Further, a process flow by the corresponding point extraction means is not limited to the flow shown in the embodiment. In the embodiment, a second local area is set after a search range in the second target image is set. However, the search range may be set after a first second local area is set around a processing point having the same coordinates as the reference point. Further, in the embodiment, a corresponding relationship is obtained for all pixels in a pair of images to be analyzed. However, the present invention is not limited thereto, the number of pixels used for the process can be appropriately set in accordance with a pixel density in the image or portions of the fundus.

In addition, six pixel information values of the R component value, the G component value, the B component value, the R edge component value, the G edge component value and the B edge component value are used in the embodiment. However, the present invention is not limited thereto, and only some of six pixel information values may be used or hue, saturation or the like may be added as the pixel information value.

Further, in the embodiment, the present invention is applied as the image analysis system and the image analysis program which restores a three-dimensional shape of a fundus. However, the present invention is not limited thereto, and the present invention can be widely applied as a technique by which the three-dimensional shape is extracted at high accuracy from an image having less information amount, such as an image of which shading distribution of some color component is not uniform.

The invention claimed is:

1. An image analysis system which captures image data of an arbitrary pair of a first image and a second image among two or more images obtained by color-photographing a single photographing object from different photographing positions into an image analysis computer for analysis,
wherein the image analysis computer comprises:
corresponding point extraction means for assigning a weighing factor to a pixel information value based on the contrast size of the pixel information value describing characteristics of a pixel in each of a first local area set around an arbitrary reference point in the first image and second local areas which are set to the same size as the first local area inside the second image and at which scanning is performed on the second image, calculating the similarity between the first local area and the second local areas, and extracting a corresponding point which corresponds to the reference point from a second local area having the highest similarity; and
depth information calculating means for calculating depth information of the photographing object based on coordinates between the reference point and the corresponding point.

2. The image analysis system according to claim 1,
wherein the corresponding point extraction means calculates the similarity by assigning zero as a weighing factor to the pixel information value, or calculates the similarity by excluding the pixel information value when the contrast size of the pixel information value is equal to or less than a predetermined value.

3. The image analysis system according to claim 1,
wherein the image analysis computer further comprises three-dimensional shape restoring means for restoring a three-dimensional shape of the photographing object based on a plurality of the depth information.

4. The image analysis system according to claim 1,
wherein the image analysis computer further comprises edge extraction means for extracting edge based on the image data, and
the pixel information value includes a plurality of values among an R component value, a G component value, and a B component value as well as an R edge component value, a G edge component value and a B edge component value extracted by the edge extraction means.

5. The image analysis system according to claim 1,
wherein the photographing object is a fundus,
the image analysis computer further comprises disc area extraction means for extracting a first disc area and a second disc area each having a disc from the first image and the second image respectively based on the image data captured into the computer, and
the corresponding point extraction means sets the reference point in the first disc area and extracts the corresponding point from the second disc area.

6. A non-transitory computer readable medium storing an image analysis program which functions the image analysis computer as:
image data capturing means for capturing image data of an arbitrary pair of the first image and the second image among two or more images obtained by color-photographing a single photographing object from different photographing positions;
corresponding point extraction means for assigning a weighing factor to a pixel information value based on the contrast size of the pixel information value describing characteristics of a pixel in each of a first local area set around an arbitrary reference point in the first image and second local areas which are set to the same size as the first local area inside the second image and at which scanning is performed on the second image, calculating similarity between the first local area and the second local areas, and extracting a corresponding point which corresponds to the reference point from a second local area having the highest similarity; and
depth information calculating means for calculating depth information of the photographing object based on coordinates between the reference points and the corresponding points.

7. A non-transitory computer readable medium storing the image analysis program according to claim 6, wherein image analysis program further functions the image analysis computer as three-dimensional shape restoring means for restoring a three-dimensional shape of the photographing object based on a plurality of the depth information.

* * * * *